United States Patent
Hedayat et al.

(10) Patent No.: US 11,259,322 B2
(45) Date of Patent: Feb. 22, 2022

(54) WIRELESS NETWORK AND EFFICIENT RANDOM ACCESS CHANNEL

(71) Applicant: Charter Communications Operating, LLC, St. Louis, MO (US)

(72) Inventors: Ahmad Reza Hedayat, Aliso Viejo, CA (US); Amitav Mukherjee, Elk Grove, CA (US); Maulik V. Vaidya, Palmdale, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/541,865

(22) Filed: Aug. 15, 2019

(65) Prior Publication Data
US 2021/0051713 A1 Feb. 18, 2021

(51) Int. Cl.
H04W 74/08 (2009.01)
H04W 52/14 (2009.01)
H04W 52/36 (2009.01)
H04W 72/04 (2009.01)

(52) U.S. Cl.
CPC ..... *H04W 74/0808* (2013.01); *H04W 52/146* (2013.01); *H04W 52/36* (2013.01); *H04W 72/0453* (2013.01)

(58) Field of Classification Search
CPC ........... H04W 74/0808; H04W 52/146; H04W 52/36; H04W 72/0453
See application file for complete search history.

(56) References Cited

U.S. PATENT DOCUMENTS

| 9,942,919 | B2* | 4/2018 | Mukherjee | H04W 74/08 |
| 2009/0036052 | A1* | 2/2009 | Miyanaga | H04L 27/18 |
| 2010/0232285 | A1* | 9/2010 | Lee | H04B 7/15507 |
| 2017/0019928 | A1 | 1/2017 | Viraraghavan | |
| 2017/0303303 | A1 | 10/2017 | Yang et al. | |

(Continued)

OTHER PUBLICATIONS

FUJITSU, "On procedure selection among 2-step and 4-step RACH", 3GPP Draft; R2-1906256 On Procedure Selection Among 2-Step and 4-Step RACH, 3rd Generation Partnership Project (3GPP), Mobile Competence Centre; 650, Route Des Lucioles; F-06921 Sophia-Antipolis CED, vol. RAN WG2, No. Reno, USA; 20190513-20190517, May 13, 2019 (May 13, 2019), XP051729726.

(Continued)

*Primary Examiner* — Ronald B Abelson
(74) *Attorney, Agent, or Firm* — Armis IP Law, LLC

(57) ABSTRACT

According to one configuration, a system includes a mobile communication device operated in a network environment. The mobile communication device can be one of multiple mobile communication devices in the network environment. To request establishing a wireless link, the mobile communication device receives a notification of an allocation of wireless channel resources. Via the allocated wireless channel resources, over a shared access channel, the first mobile communication device communicates a wireless connection request to a wireless base station. In one example configuration, the wireless request communicated over the allocated wireless channels includes: i) a first wireless communication including a preamble (such as PRACH message), and ii) a second wireless communication (such as a PUSCH message) including information for establishing a wireless communication link.

34 Claims, 10 Drawing Sheets

(56) References Cited

U.S. PATENT DOCUMENTS

| | | | | |
|---|---|---|---|---|
| 2017/0332409 | A1* | 11/2017 | Yerramalli | H04W 74/08 |
| 2018/0027594 | A1* | 1/2018 | Nagaraja | H04W 74/0833 |
| 2018/0110074 | A1 | 4/2018 | Akkarakaran et al. | |
| 2018/0110075 | A1 | 4/2018 | Ly et al. | |
| 2018/0206271 | A1* | 7/2018 | Chatterjee | H04W 74/0833 |
| 2018/0316474 | A1* | 11/2018 | Mukherjee | H04L 5/00 |
| 2019/0124649 | A1* | 4/2019 | Lunttila | H04L 5/001 |
| 2020/0021999 | A1* | 1/2020 | Park | H04W 16/14 |
| 2020/0053798 | A1* | 2/2020 | Tsai | H04W 74/08 |
| 2020/0267774 | A1* | 8/2020 | Vos | H04W 74/08 |
| 2020/0314837 | A1* | 10/2020 | Oh | H04W 72/0413 |
| 2020/0359458 | A1* | 11/2020 | Xiong | H04W 72/0466 |

OTHER PUBLICATIONS

Nomor Research GMBH et al.: "Initial Random Access Procedure in Non-Terrestrial Networks (NTN)", 3GPP Draft; R2-1818510 RACH, 3rd Generation Partnership Project (3GPP), Mobile Competence Centre; 650, Route Des Lucioles ; F-06921 Sophia-Antipolis Cedex; France, vol. RAN WG2, No. Spokane, USA; 20181112-20181116. Nov. 2, 2018 (Nov. 2, 2018), XP051482366.

Annex to Form PCT/ISA/206, Communication Relating to the Results of the Partial International Search/PCT/US2020/045738, Oct. 2, 2020, p. 3-17.

International Search Report, PCT/US2020/045742, Oct. 7, 2020, pp. 1-14.

Nokia et al: "2-step RACH Procedure Feature Lead Summary", 3GPP Draft; RI-1907726 2-Step RACH Procedure Feature Lead Summary RAN1#97, 3rd Generation Partnership Project (3GPP), Mobile Competence Centre; 650, Route Des Lucioles; F-06921 Sophia-Antipolis Cede, vol. RAN WG1, No. Reno, USA; 20190513-20190517, May 16, 2019 (May 16, 2019), XP051740005.

Spreadtrum Communications: "Considerations on the channel structure on 2-step RACH", 3GPP Draft RI-1904778 Considerations on the Channel Structure on 2-Step RACH V1.0, 3rd Generation Partnership Project (3GPP), Mobile Competence Centre; 650, Route Des Lucioles; F-06921 Sophia-Antip, vol. RAN WG1, No. Xi 'an, China; 20190408-20190415, Apr. 7, 2019 (Apr. 7, 2019), XP051699953.

ZTE: "Summary of 7.2.1.1 Channel Structure for Two-step RACH", 3GPP Draft; RI-1907673 FL Summary for 2-Step RACH Channel Structure, 3rd Generation Partnership Project (3GPP), Mobile Competence Centre; 650, Route Des Lucioles; F-06921 Sophia Antipolis Cedex; FR, vol. RAN WG1, No. Reno, USA; 20190513 20190517, May 16, 2019 (May 16, 2019), XP051739962.

* cited by examiner

WIRELESS NETWORK AND EFFICIENT RANDOM ACCESS CHANNEL

BACKGROUND

In general, a random access procedure is used by respective user equipment (UE) in a wireless network environment to establish a wireless communication link for a respective data transfer.

There are multiple conventional random channel access procedures including a so-called 4-step random channel access procedure and a 2-step random channel access procedure.

A baseline 4-step channel access procedure (RACH) in NR (New Radio) consists of exchanging four messages (msg1, msg2, msg3, and, msg4) between respective user equipment and a gNB (gNodeB):

1) Msg1 is the preamble transmitted by the UE (User Equipment) to gNB. There are various preamble formats supported in the baseline. UE selects a PRACH (preamble) and send it in a designated time and frequency location after reading RACH parameters from SIB2. Note that in FR2 operation, the UE first selects the best SSB from SS burst and then it sends corresponding PRACH (related to that SSB) to gNB. This way the UE selects the beam and then it transmits the PRACH (preamble) on same beam.

2) After detection of the Msg1, gNB sends Msg2 or random access response (RAR) to the UE; message 2 carries: timing advance (TA), temporary C-RNTI, and an UL grant for subsequent transmission by USER EQUIPMENT. The UL grant includes: Freq. hopping flag, Msg3 PUSCH freq./time resource allocation, MCS, power control command for Msg3, and CSI request.

3) UE tries to decode RAR by detecting a PDCCH, with DCI format 1_0, with corresponding RA-RNTI during a RAR window. If a PDCCH with the RA-RNTI is detected, then the PDSCH is decoded. If the carried RAP-ID is same as expected for the transmitted PRACH, the UE then obtains the UL grant for transmission of Msg3 and sends Msg3 in the UL grant If the carried RAP-ID is not as expected, the procedure starts again with transmission of a new PRACH.

4) After detecting Msg3, the gNB sends Msg4 to the UE which also concludes contention resolution.

The processing of each of above messages takes maybe a few time slots, which amounts to many slots in total, considering the processing time by UE or gNB after receiving each of the messages. Given that RACH is initiated by MAC during several procedures, the total delay by conclusion of a RACH procedure adds to the overall delay.

Due to the overall delay, 3GPP has defined a 2-step RACH procedure. The conventional 2-step random channel access procedure includes message A and message B.

Message A (MsgA) is the first message transmitted by the UE to the gNB, which consists of a preamble (PRACH) followed by a (PUSCH) channel that carries additional information. Message B (MsgB) is the response message by the gNB that potentially concludes contention resolution. If gNB does not fully decode MsgA, it may send a RAR to the UE which leads the procedure to fall back to 4-step RACH (also referred to as fallback RAR).

In certain instances, user equipment may support 2-step RACH capability or the baseline 4-step RACH as well. In a 2-step RACH, the content of Msg2 response from gNB depends on factors such as the level of MsgA decoding.

If gNB successfully decodes the preamble and the accompanying PUSCH in message A, then the gNB responds with MsgB successRAR.

However, if the gNB successfully decodes the preamble but not the accompanying PUSCH in message A, the gNB responds with MsgB fallbackRAR (which is equivalent to Msg2).

BRIEF DESCRIPTION OF EMBODIMENTS

There are deficiencies associated with conventional techniques of implementing RACH channel access procedure. For example, in NR-Unlicensed (NR-U) operation, for transmission of each of the messages in (4-step or 2-step channel access procedure) RACH, the sender (mobile communication device) is required to perform a listen-before-talk (a.k.a., LBT) procedure in accordance with regulatory requirements. The LBT requirements further adds to the overall delay of the 4-step RACH.

Additionally, according to conventional techniques of communicating message A in a 2-step RACH channel access procedure, the preamble (or PRACH information) is transmitted over first wireless resources (such as allocated one or more first contiguous carrier frequencies or effectively a PRACH channel); in contrast, the connection request (such as PUSCH information or effectively a PUSCH channel) is transmitted over second wireless resources (such as allocated one or more second non-contiguous carrier frequencies).

When transmitting the PRACH message and the PUSCH message associated with message A according to the conventional 2-step channel access procedure techniques, the user equipment must switchover from using the first carrier frequencies to the second carrier frequencies to transmit the entire message A (PRACH message plus PUSCH message). Thus, there is a time gap between the PRACH communication and the PUSCH communication associated with message A. This forces the user equipment to perform 2 listen before talk procedures—one listen before talk to communicate the PRACH information, and another listen before talk procedure to communicate the PUSCH information. This is undesirable because it adds the further delay of communicating combination of PRACH/PUSCH information from the user equipment to the wireless base station over different channels.

Embodiments herein provide improved use of allocated wireless resources to support wireless communications in network environment.

More specifically, one embodiment herein includes a system comprising a first mobile communication device operated in a network environment. The first mobile communication device can be one of multiple mobile communication devices in the network environment. In this example embodiment, assume that the first mobile communication device receives a notification of an allocation of wireless channel resources. The first mobile communication device communicates a wireless connection request to a wireless base station using the allocation of the wireless channel resources. In one example embodiment, the wireless request includes: i) a first wireless communication including a preamble, and ii) a second wireless communication including connection request information for establishing a wireless communication link.

In accordance with further embodiments, the allocated set of wireless channel resources includes identities of a set of wireless carrier frequencies (such as so-called resource blocks, which are time-frequency domain resources). By way of non-limiting example embodiment, in contrast to conventional techniques, the wireless carrier frequencies in the allocated set are non-contiguous with respect to each other and are allocated to transmit both the first communication (such as preamble information) and the second communication (such as connection request information).

Via the allocated set of wireless channel resources (such as non-contiguous wireless carrier frequencies), the first mobile communication device transmits the first wireless communication including the preamble over the allocated set of non-contiguous wireless carrier frequencies.

In one embodiment, the preamble communicated from the first mobile communication device to the wireless base station is partitioned into multiple portions including at least a first preamble portion and a second preamble portion. The first mobile communication device transmits the first preamble portion over a first carrier frequency of the allocated wireless channel resources; the first mobile communication device transmits the second preamble portion over a second carrier frequency of the allocated wireless channel resources.

In accordance with yet further embodiments, the first mobile communication device transmits the first preamble portion and the second preamble portion in a same timeslot. Accordingly, embodiments herein include communicating the different preamble portions over multiple carrier frequencies in the same timeslot.

In still further embodiments, the first wireless communication from the first mobile communication device is a PRACH (Physical Random Access Channel) message; the second wireless communication from the first mobile communication device is a PUSCH (Physical Uplink Shared Channel) message. In one example embodiment, a combination of the first wireless communication and the second wireless communication represent wireless request message information such as a message A of a 2-step RACH (Random Access Channel procedure).

Yet further embodiments herein include, at the first mobile communication device: completing communication of both the first wireless message and the second wireless message over the acquired wireless channel resources within a channel occupancy time of the first mobile communication device acquiring use of the allocated wireless channel resources.

Further embodiments herein include varying a respective wireless power level of transmitting contents of the second wireless communication. For example, in one embodiment, subsequent to transmitting a first instance of the first wireless communication at a first power level, the first mobile communication device varies a magnitude of repeatedly transmitting subsequent instances of the second wireless communication to the wireless base station. Varying of the magnitude can include: ramping a wireless power level of transmitting one or more of the subsequent instances of the second wireless communication until the mobile communication device receives a response from the wireless base station.

In yet further embodiments, the first mobile communication device applies separate wireless power adjustments to each of the first wireless communication and the second wireless communication.

As further discussed herein, embodiments include repeatedly transmitting a combination of the first wireless communication and the second wireless communication as needed until the wireless base station acknowledges receipt of the wireless request message information (such as preamble and connection request information).

Embodiments herein are useful over conventional techniques. For example, use of the same set of allocated wireless frequency domain resources (such as one or more carrier frequencies) eliminates a need to perform a listen before talk routine in between sending the PRACH/PUSCH information over different channels because the same allocated frequency domain resources are used by the mobile communication device to communicate both the PRACH information and PUSCH information. In other words, use of the same allocated wireless resources according to embodiments herein alleviates the need to set up antenna resources of the mobile communication device and power adjusts for a new set of wireless channel resources as is needed using conventional techniques.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive notification of an allocation of wireless channel resources; and communicate a wireless connection request to a wireless base station using the allocation of the wireless channel resources, the wireless connection request including: i) a first wireless communication including a preamble; and ii) a second wireless communication including connection request information for establishing a wireless communication link.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
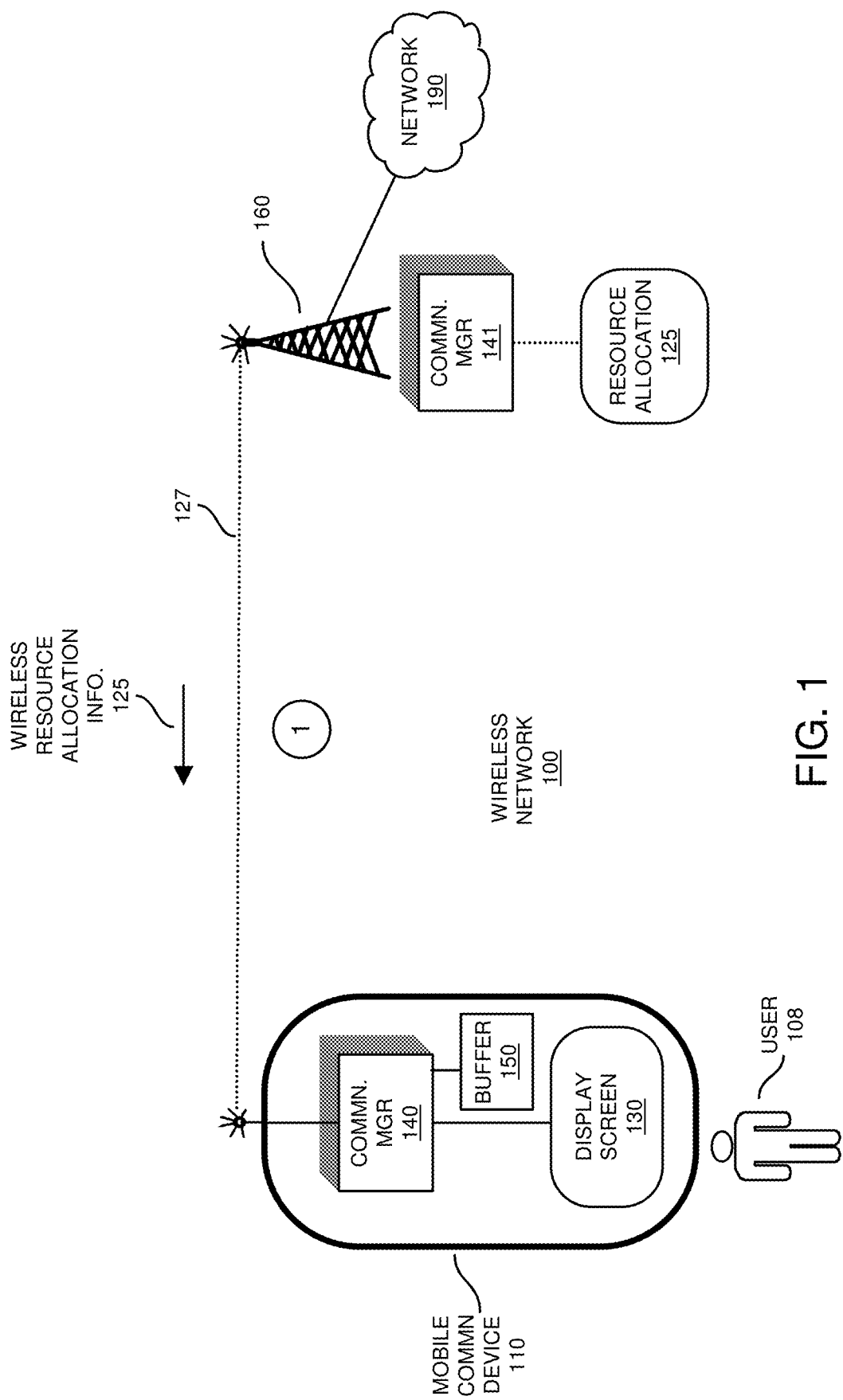
FIG. 1 is an example diagram illustrating allocation of resources in a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A system includes a first mobile communication device operated in a network environment. The first mobile communication device is one of multiple mobile communication devices operated in the network environment. Initially, the first mobile communication device receives a notification of an allocation of wireless channel resources in which to communicate connection request messages. Via the allocated wireless channel resources, the first mobile communication device communicates wireless request message information to a wireless base station. In one example configuration, the wireless request message information includes: i) a first wireless communication (such as a PRACH message or the like) including a preamble transmitted over a first channel, and ii) a second wireless communication (such as a PUSCH message or the like) including connection request information for establishing a wireless communication link transmitted over a second channel.

Now, with reference to the drawings, FIG. 1 is an example diagram illustrating allocation of resources in a wireless network environment according to embodiments herein.

As shown in this example embodiment, wireless network environment 100 includes mobile communication device 110 (a.k.a., user equipment) operated by user 108. The mobile communication device 110 (such as user equipment) includes communication manager 140 and corresponding one or more wireless interface (such as one or more antennas), supporting wireless communications with the wireless base station 160 or other wireless base stations in network environment 100. The mobile communication device 160 further includes a display screen operative to display images for viewing by the respective user 108.

The wireless network 100 further includes wireless base station 160. Wireless base station 160 (such as a gNodeB) includes communication manager 141 supporting communications with one or more mobile communication devices (different instances of user equipment) in the network environment 100.

Note that the wireless stations (wireless base station 160, mobile communication device 110, etc.) in wireless network can be configured to operate in any suitable carrier frequency.

In one embodiment, the wireless base station 160 and the mobile communication device 110 support wireless communications in an unlicensed radio band such as 5G NR-U, although the wireless stations as discussed herein can be implemented to support any suitable wireless spectrum.

As further shown, in one embodiment, the mobile communication device 110 receives notification of an allocation of wireless channel resources via wireless resource allocation information 125 broadcasted from the wireless base station 160 or other suitable resource.

In one embodiment, the wireless resource allocation information 125 includes information facilitating communications from the mobile communication device 110 to the wireless base station 160 over a shared random access channel over which the mobile communication device 110 and other mobile communication devices in the network environment 100 potentially compete for use to communicate with the wireless base station 160. In one embodiment, the mobile communication device uses the allocated resources to request a wireless communication link over which to communicate data to the wireless base station.

In one embodiment, the wireless resource allocation information 125 indicates one or more so-called preambles (such as 64 preambles or other suitable number) that are selectable by the mobile communication device 110 to communicate over the shared random access channel.

Note that the wireless resource allocation information 125 can be configured to further include information such as frequency domain resources, time domain resources, etc., that are allocated for use by the mobile communication device 110 (or other mobile communication devices in the network environment 100) to communicate over a respective shared random access channel to the wireless base station 160.

In one embodiment, the wireless resource allocation information 125 indicates one or more so-called resource blocks (partitioned in the time domain and frequency domain) available for use by the mobile communication device 110 to communicate information to the wireless base station 160.

As indicated by the wireless resource allocation information 125, the allocated set of wireless channel resources includes identities of a set of wireless carrier frequencies (such as so-called resource blocks as previously discussed). By further way of non-limiting example embodiment, the wireless carrier frequencies in the allocated set are non-contiguous (a.k.a., interlaced in which there is a gap between one carrier frequency and the next) with respect to each other in which to transmit the first communication and the second communication.

Note that the shared random access channel can be used for any suitable purpose such as to request establishing of a wireless communication link between a mobile communication device and a wireless base station in the network environment 100. One reason for the mobile communication device 110 to request a wireless communication link is because the mobile communication device 110 has data in buffer 150 that needs to be transmitted to a destination in the remote network 190.

Subsequent to establishing a respective wireless communication link between the mobile communication device and the wireless base station, the mobile communication device 110 is able to communicate through the wireless base station 160 to the remote network. Conversely, one or more server resources in the remote network 190 are able to communicate through the wireless base station 160 to the mobile communication device 110.

Assume in this example embodiment that the communication manager 140 receives input (such as triggered based on data in the buffer 150) indicating to establish a wireless communication link with the wireless base station 160. In such an instance, as shown in FIG. 2, the mobile communication device 110 implements a listen before talk protocol prior to communicating over the shared random access channel to the wireless base station 160.

Figure 2:
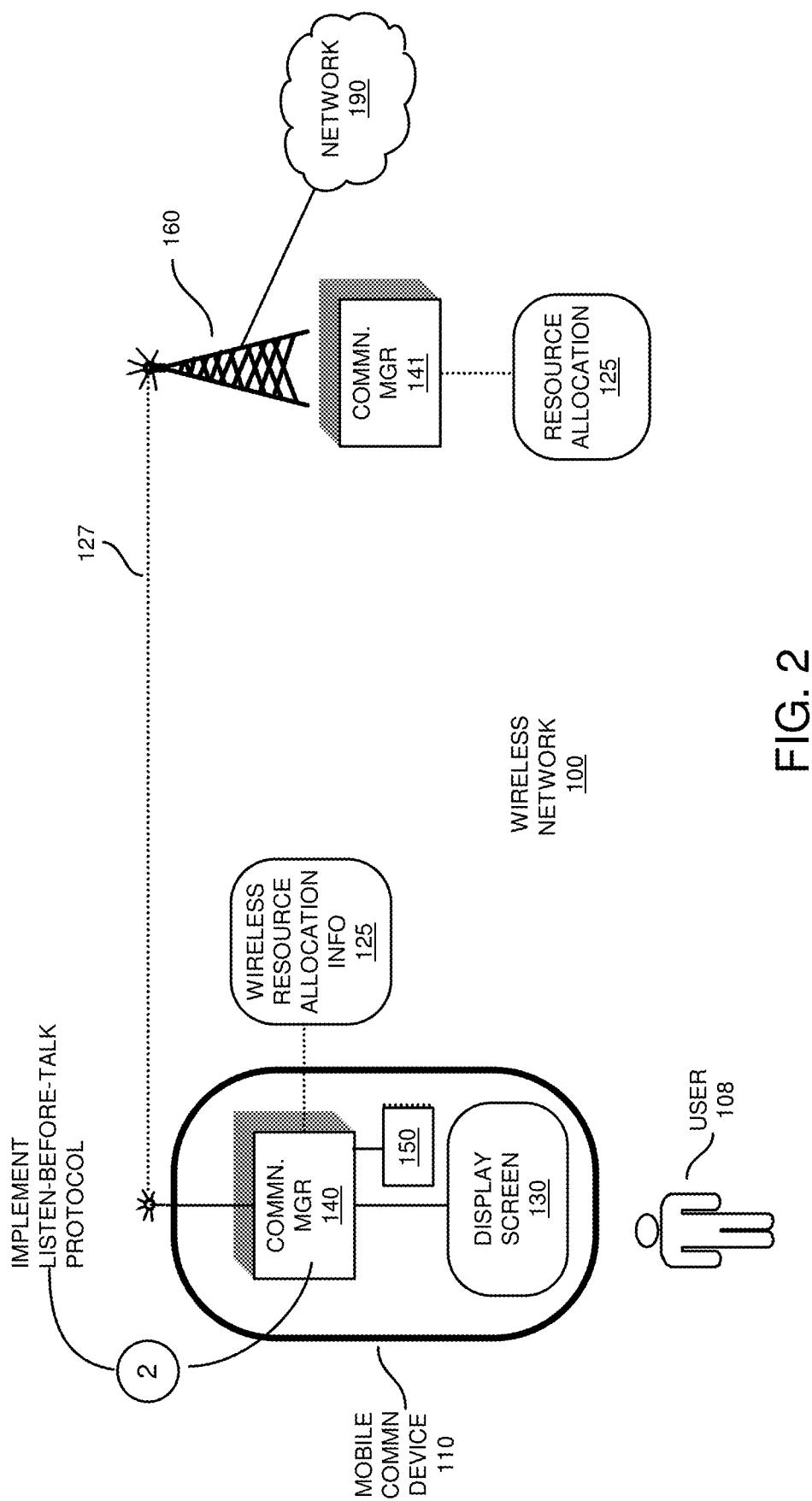
FIG. 2 is an example diagram illustrating implementation of a listen before talk protocol to acquire a wireless channel according to embodiments herein.

Accordingly, FIG. 2 is an example diagram illustrating the mobile communication device 110 executing a listen before talk protocol to acquire a wireless channel according to embodiments herein.

Figure 3:
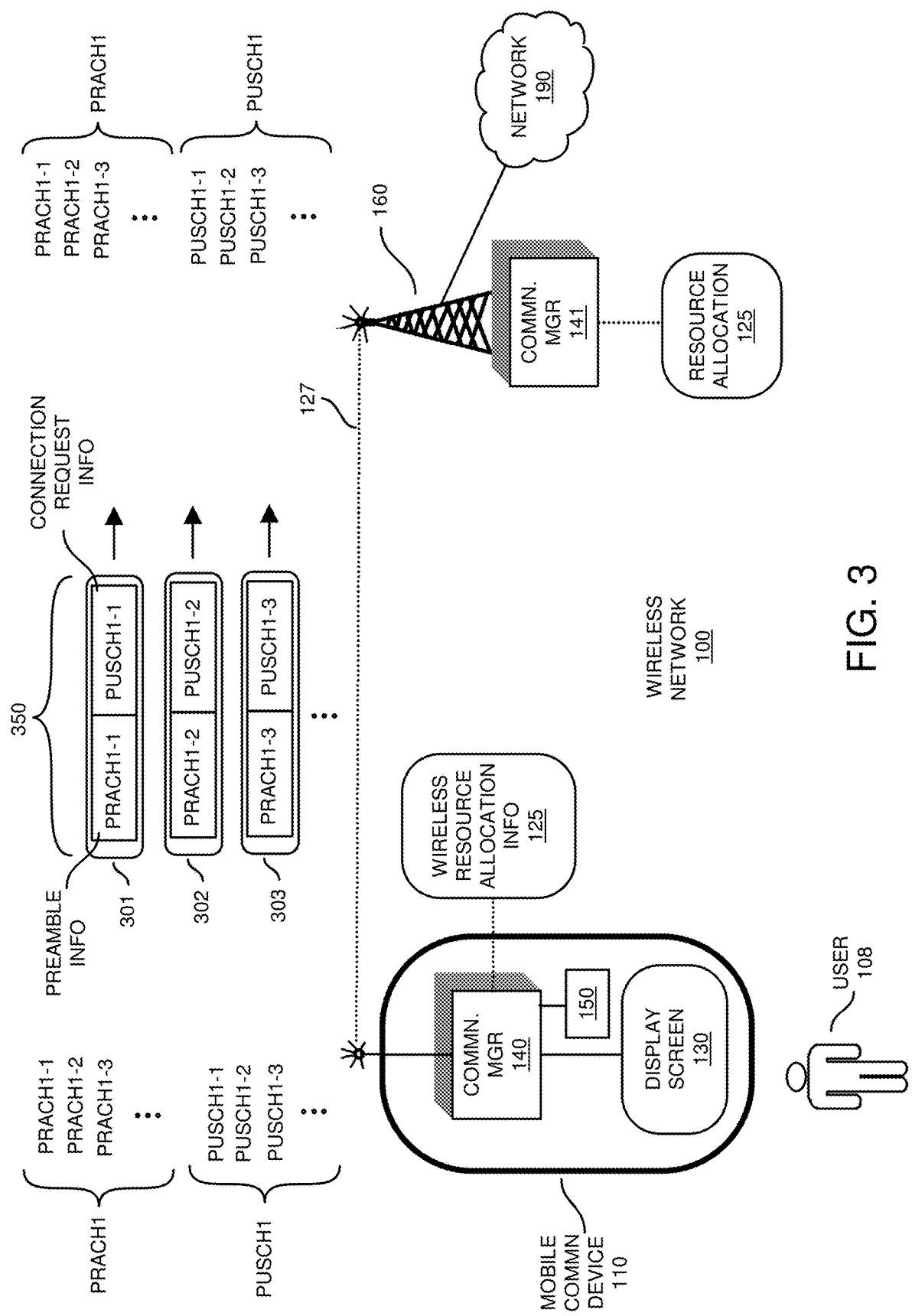
FIG. 3 is an example diagram illustrating communication of messages over an acquired channel according to embodiments herein.

In response to acquiring use of the shared random access channel, the mobile communication device generates further communications as shown in FIG. 3.

FIG. 3 is an example diagram illustrating communication of messages over an acquired channel according to embodiments herein.

As previously discussed, the mobile communication device 110 receives wireless resource allocation information 125 from the wireless base station 160 or other suitable resource. In furtherance of establishing a respective wireless communication link with the wireless base station 160, the mobile communication device 110 implements a channel access procedure (such as a novel 2-step random channel access procedure) to establish a respective wireless communication link with the wireless base station 160.

For example, as shown in FIG. 3, the mobile communication device 110 communicates a wireless connection request message 350 to the wireless base station 350 using the allocation of the wireless channel resources as indicated by the wireless resource allocation information 125.

In accordance with further embodiments, the wireless request message 350 includes: i) a first wireless communication including a preamble message such as a PRACH1 message, and ii) a second wireless communication such as a PUSCH1 message including connection request information for establishing a wireless communication link.

As previously discussed, to communicate a request to establish a wireless channel, the communication manager 140 of the mobile communication device 110 selects one of multiple preambles (such as preamble PRACH1 in this example embodiment) associated with the wireless base station 160.

To facilitate transmission of the selected preamble PRACH1, the communication manager 140 partitions (subdivides) the bits in the preamble PRACH1 into multiple bit components including a first preamble portion (PRACH1-1), second preamble portion (PRACH1-2), third preamble portion (PRACH1-3), and so on.

As further shown below, subdividing the preamble information PRACH1 enables the preamble information to be communicated to the wireless base station 160 over multiple different frequency domain resources such as different spaced apart sets of wireless communication channels (or bandwidths) as specified by the wireless resource allocation information 125.

In addition to communicating preamble information (PRACH1) from the mobile communication device 110 to the wireless base station 160, the communication manager 140 associated with the mobile communication device 110 also communicates connection request information PUSCH1 (such as multiple bits of information) over the shared random access channel to the wireless base station 160.

In one embodiment, to facilitate transmission of the selected connection request information PUSCH1 to the wireless base station 160, the communication manager 140 partitions (subdivides) the bits in the connection request information PUSCH1 into multiple components including a first connection request information portion (PUSCH1-1), second connection request information portion (PUSCH1-2), third connection request information portion (PUSCH1-3), and so on.

As further shown below, subdividing the connection request information (PUSCH1 message) enables the connection request information to be communicated to the wireless base station 160 over multiple different frequency domain resources such as wireless communication channels as specified by the wireless resource allocation information 125.

As further shown, communication of the portions of preamble information PRACH1 and the connection request information PUSCH1 from the mobile communication device 110 to the wireless base station 160 includes combining portions of the preamble information and the connection request information into a wireless request message 350 and transmitting the wireless request message 350 from the mobile communication device 110 to the wireless base station 160 over the acquired shared random access channel (acquired via implementation of a listen before talk protocol as previously discussed in FIG. 2).

More specifically, a first preamble portion PRACH1-1 and first connection request information portion PUSCH1-1 are communicated in a respective resource block 301 (first specific band of carrier frequencies in a first specified timeslot) from the mobile communication device 110 to the wireless base station 160; a second preamble portion PRACH1-2 and second connection request information portion PUSCH1-2 are communicated in a respective resource block 302 (second specific band of carrier frequencies and the first specified timeslot) from the mobile communication device 110 to the wireless base station 160; a third preamble portion PRACH1-3 and third connection request information portion PUSCH1-3 are communicated in a respective resource block 303 (third specific band of carrier frequencies and the first specified timeslot) from the mobile communication device 110 to the wireless base station 160; and so on.

Note that that even though the different portions of the preamble information and the connection request information associated with wireless request message information 350 are communicated in a same resource block (same allocated set of non-contiguous carrier frequencies), each of the preamble information and the connection request information are communicated over different logical channels. For example, the first preamble portion PRACH1-1, second preamble portion PRACH1-2, third preamble portion PRACH1-3, etc., are transmitted over a first wireless channel (such as a PRACH channel) using allocated wireless resources; the first connection request information portion PUSCH1-1, second connection request information portion PUSCH1-2, third information connection request information portion PUSCH1-3, etc., are transmitted over a second wireless channel (such as a PUSCH channel) using the same allocated resources. Transmission of the different channels of information (preamble information and the connection request information) over the same allocated carrier frequencies alleviates the need to implement an additional listen before talk protocol as well as alleviates the need to adjust power output of antennas if different carrier frequencies were used for each of the different channels.

As further discussed below, note that the connection request information communications, carried in PUSCH, are transmitted within a predetermined threshold amount of time (such as 16 microseconds or any suitable value) with respect to an end of transmitting a respective preamble message. More specifically, a time gap between an end of transmitting the preamble portion PRACH1-1 and starting transmission of the connection request information portion PUSCH1-1 is less than the threshold value; a time gap between an end of transmitting the preamble portion PRACH1-2 and starting transmission of the connection request information portion PUSCH1-2 is less than the threshold value; a time gap between an end of transmitting the preamble portion PRACH1-3 and starting transmission of the connection request information portion PUSCH1-3 is less than the threshold value; and so on. Transmission within the threshold value alleviates the need for the communication manager 140 of the mobile communication device 110 from having to perform another listen before talk protocol to acquire the shared random access channel to transmit the PUSCH message.

In one example embodiment, a combination of the first wireless preamble communication and the second wireless connection request communication represent a message A of a 2-step RACH (Random Access Channel) procedure. In other words, in one embodiment, the wireless request message 350 represents message A in a respective 2-step RACH procedure.

As further shown, the communication manager 141 associated with the wireless base station 160 processes the received wireless request message information 350, which includes data communicated in multiple resource blocks 301, 302, 303, etc.

Note that the wireless request message information 350 can be received in a single timeslot, multiple timeslots, multiple carrier frequencies, etc.

In accordance with further embodiments, the communication manager 141 processes the received wireless request message information 350 to retrieve the first preamble portion PRACH1-1, second preamble portion PRACH1-2, third preamble portion PRACH1-3, etc., as well as the first connection request information portion PUSCH1-1, second connection request information portion PUSCH1-2, third information connection request information portion PUSCH1-3, etc.

The communication manager 141 combines the different portions of received information to reproduce the original messages from the mobile communication device 110. For example, the communication manager 141 combines the preamble portion PRACH1-1, second preamble portion PRACH1-2, third preamble portion PRACH1-3, etc., to produce the original preamble message PRACH1. The communication manager 141 combines the first connection request information portion PUSCH1-1, second connection request information portion PUSCH1-2, third information connection request information portion PUSCH1-3, etc., to produce the connection request information message PUSCH1.

In this manner, the communication manager 141 receives the preamble message PRACH1 over a PRACH channel (first logical channel) and the connection request information PUSCH1 over a PUSCH channel (second logical channel) using the shared set of resources.

Figure 4:
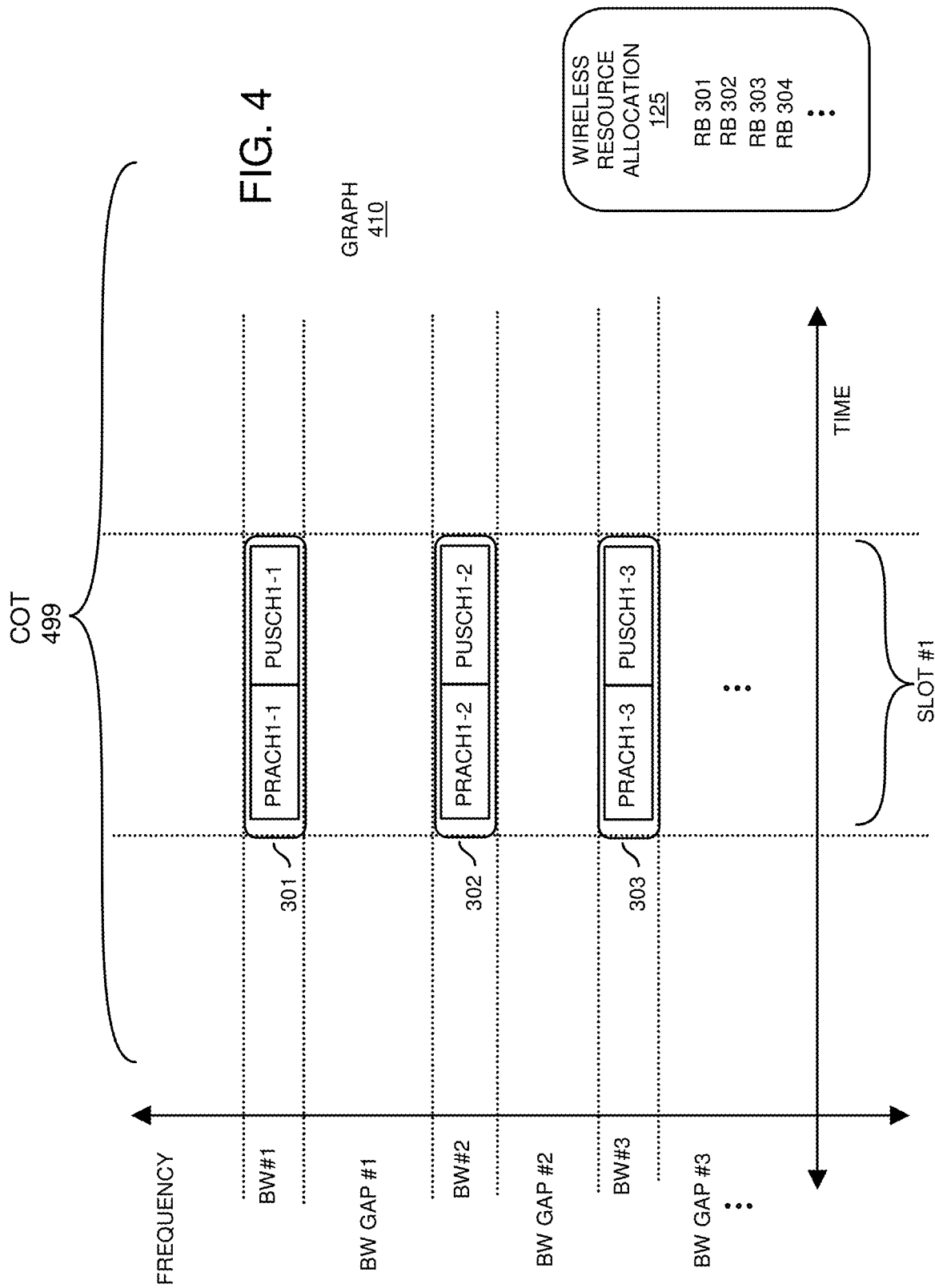
FIG. 4 is an example diagram illustrating communication of different portions of a first wireless communication (such as PRACH or preamble communications) and a second wireless communication (such as PUSCH communications or connection request information) using allocated wireless resources according to embodiments herein.

FIG. 4 is an example diagram illustrating communication of different portions of a first wireless communication (such as PRACH or preamble communications) and a second wireless communication (such as PUSCH or connection request communications) using allocated wireless resources according to embodiments herein.

As shown in graph 410 of FIG. 4, the allocated set of wireless channel resources as specified by the wireless resource allocation information 125 includes identities of set of wireless carrier frequencies or bandwidths (such as so-called resource blocks 301, 302, 303, etc.) assigned for use by the wireless base station 160.

By way of non-limiting example embodiment, the wireless carrier frequencies associated with resource blocks 301, 302, 303, etc., in the allocated set are non-contiguous bands of carrier frequencies with respect to each other in which to transmit the preamble information and the connection request information. In other words, resource block 301 represents a first portion of bandwidth BW #1 (such as one or more carrier frequencies) allocated to convey first data in timeslot #1; resource block 302 represents a second portion of bandwidth BW #2 (such as one or more carrier frequencies) allocated to convey second data in timeslot #1; resource block 303 represents a third portion of bandwidth BW #3 (such as one or more carrier frequencies) allocated to convey third data in timeslot #1; and so on.

As further shown in graph 410, the bandwidth allocated to support conveyance of wireless communications is distributed about an available wireless spectrum. For example, bandwidth BW #1 is spaced apart from bandwidth BW #2 by the bandwidth gap BWGAP #1; bandwidth BW #2 is spaced apart from bandwidth BW #3 by the bandwidth gap BWGAP #2; and so on. In contrast to conventional techniques, the preamble information (such as PRACH1) is transmitted over the different bandwidths #1, #2, #3, etc.

As previously discussed, the preamble communicated from the mobile communication device 110 to the wireless base station 160 is partitioned into multiple portions including a first preamble portion PRACH1-1, second preamble portion PRACH1-2, third preamble portion PRACH1-3, and so on. The mobile communication device 110 transmits the first preamble portion PRACH1-1 over a first set of one or more carrier frequencies (such as bandwidth BW #1) of the allocated wireless channel resources; the mobile communication device 110 transmits the second preamble portion PRACH1-2 over a second set of one or more carrier frequencies (such as bandwidth BW #2) of the allocated wireless channel resources; the mobile communication device 110 transmits the third preamble portion PRACH1-3 over a third set of one or more carrier frequencies (such as bandwidth BW #3) of the allocated wireless channel resources; and so on.

Thus, via the allocated set of wireless channel resources (such as non-contiguous wireless carrier frequencies as specified by BW #1, BW #2, etc.), the mobile communication device 110 transmits the wireless communication (message PRACH1) including the preamble over the allocated set of non-contiguous wireless carrier frequencies.

As further shown in graph 410 of FIG. 4, although transmitted over different carrier frequencies, note that the mobile communication device 110 transmits the different preamble portions PRACH1-1, PRACH1-2, etc., in a same timeslot (i.e., slot #1).

Yet further embodiments herein include, at the mobile communication device 110, completing communication of both the first wireless message (preamble information) and the second wireless message (connection request information) over the acquired wireless channel resources within a channel occupancy time 499 (such as a threshold value of 16 microseconds, 25 microseconds, or other suitable value) of the mobile communication device 110 acquiring use of the shared random access channel (as in FIG. 2). As previously discussed, this alleviates the need for the mobile communication device 110 from having to execute the listen before talk protocol again to transmit the different types of information.

Figure 5:
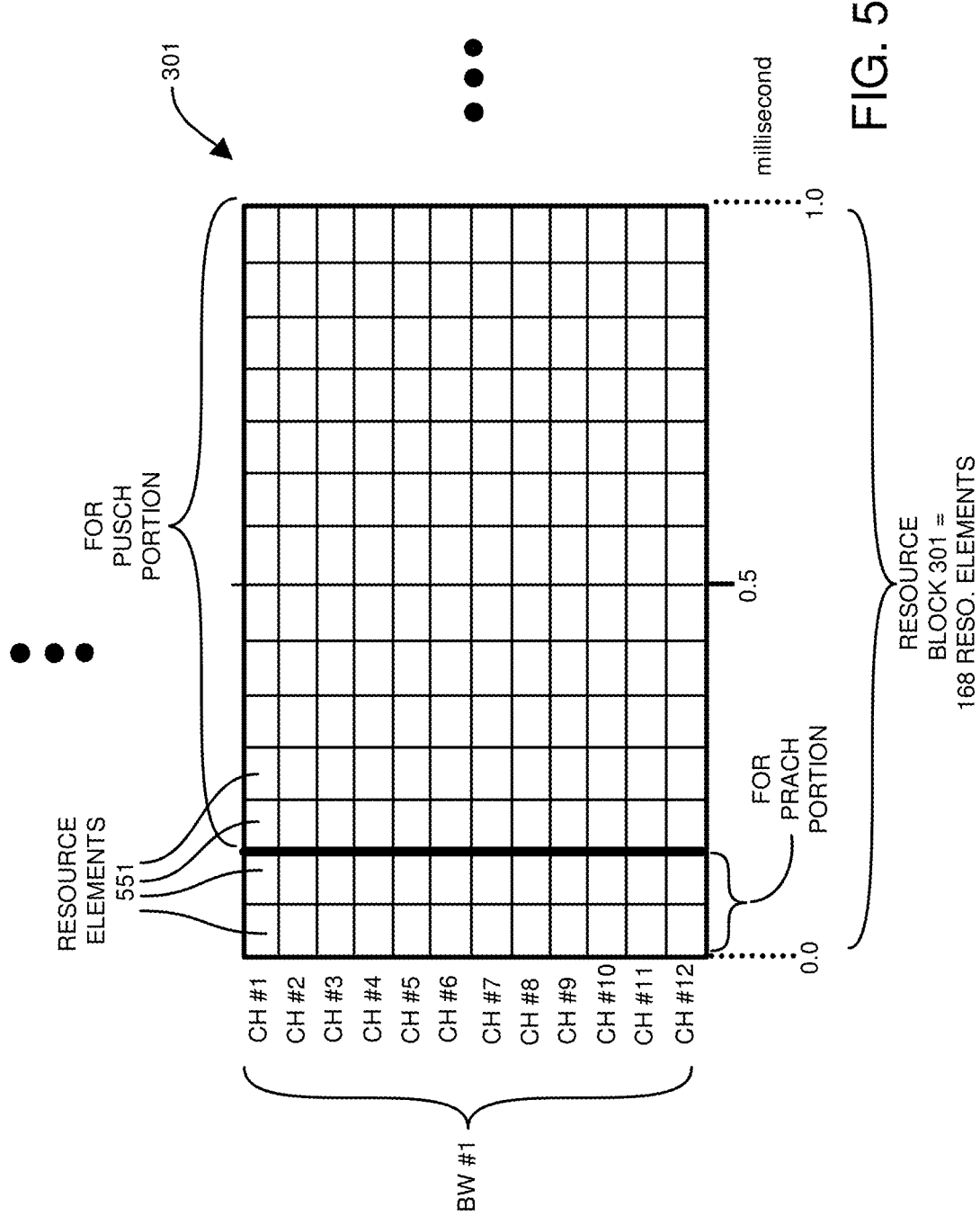
FIG. 5 is an example diagram illustrating one of multiple allocated resource blocks according to embodiments herein.

FIG. 5 is an example diagram illustrating one of multiple allocated resource blocks according to embodiments herein.

In one embodiment, each of the resource blocks 301, 302, 303, etc., includes 168 resource elements 551 as shown in FIG. 5.

For example, resource block 301 in FIG. 5 includes a grid of multiple resource elements 551. A first portion of block 301 includes 84 resource elements 551 (between time 0.0 and 0.5. mS); a second portion of resource block 301 includes 84 resource elements 551 (between time 0.5 and 1.0 mS). This totals 168 resource elements for the resource block 301.

Note that the duration and number of resource elements in the resource block 301 can vary depending on the embodiment. Additionally, the number of carrier frequencies (such as channels 1-12) assigned to a resource block can vary depending on the embodiment.

Each resource element enables transmission of data. For example, in one embodiment, each resource element conveys one symbol in a respective sub-channel such as channel #1, channel #2, channel #3, channel #4, etc. Thus, block 301 in this example embodiment (such as resource block of 1 mS duration and 12 channels) supports conveyance of 168 symbols (14 resource elements per channel times 12 channels) between the mobile communication device 110 and the wireless base station 160.

In one non-limiting example embodiment, the communication manager 140 uses a first portion such as first two columns of resource elements 551 in resource block 301 to communicate preamble information (PRACH1 message information); the communication manager 140 uses a second portion of the resource elements 551 in the resource block 301 to communicate preamble information (PRACH1 message information) such as last twelve columns of resource elements 551 in resource block 301.

As described herein, each resource block can be partitioned and used in any manner to send PRACH and PUSCH message information. For example, if desired, all resource elements in a respective resource block can be used to communicate preamble information; all resource elements in a respective resource block can be used to communicate connection request information; different portions of each resource block can be partitioned to support conveyance of preamble information and connection request information.

Figure 6:
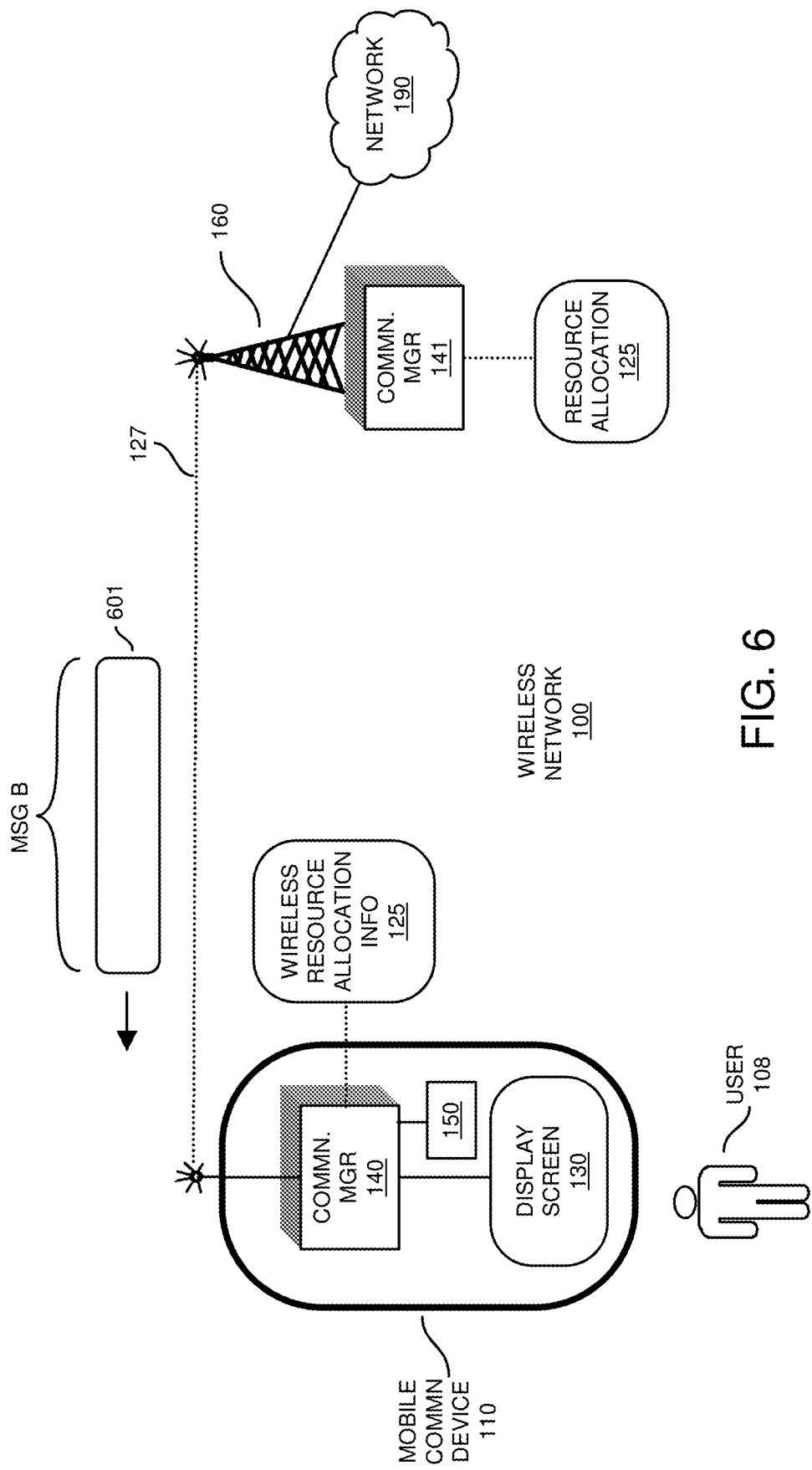
FIG. 6 is an example diagram illustrating a response message from a wireless base station according to embodiments herein.

FIG. 6 is an example diagram illustrating a response message from a wireless base station according to embodiments herein.

In response to receiving the wireless request message information 350 (such as message A) transmitted from the mobile communication device 110 to the wireless base station 160 in a manner as previously discussed, the communication manager 141 communicates message B over one or more resource blocks to the mobile communication device 110. In one embodiment, the message B from the wireless base station 160 includes scheduling information and/or other suitable information facilitating establishment of a wireless communication link between the mobile communication device 110 and the wireless base station 160.

Figure 7:
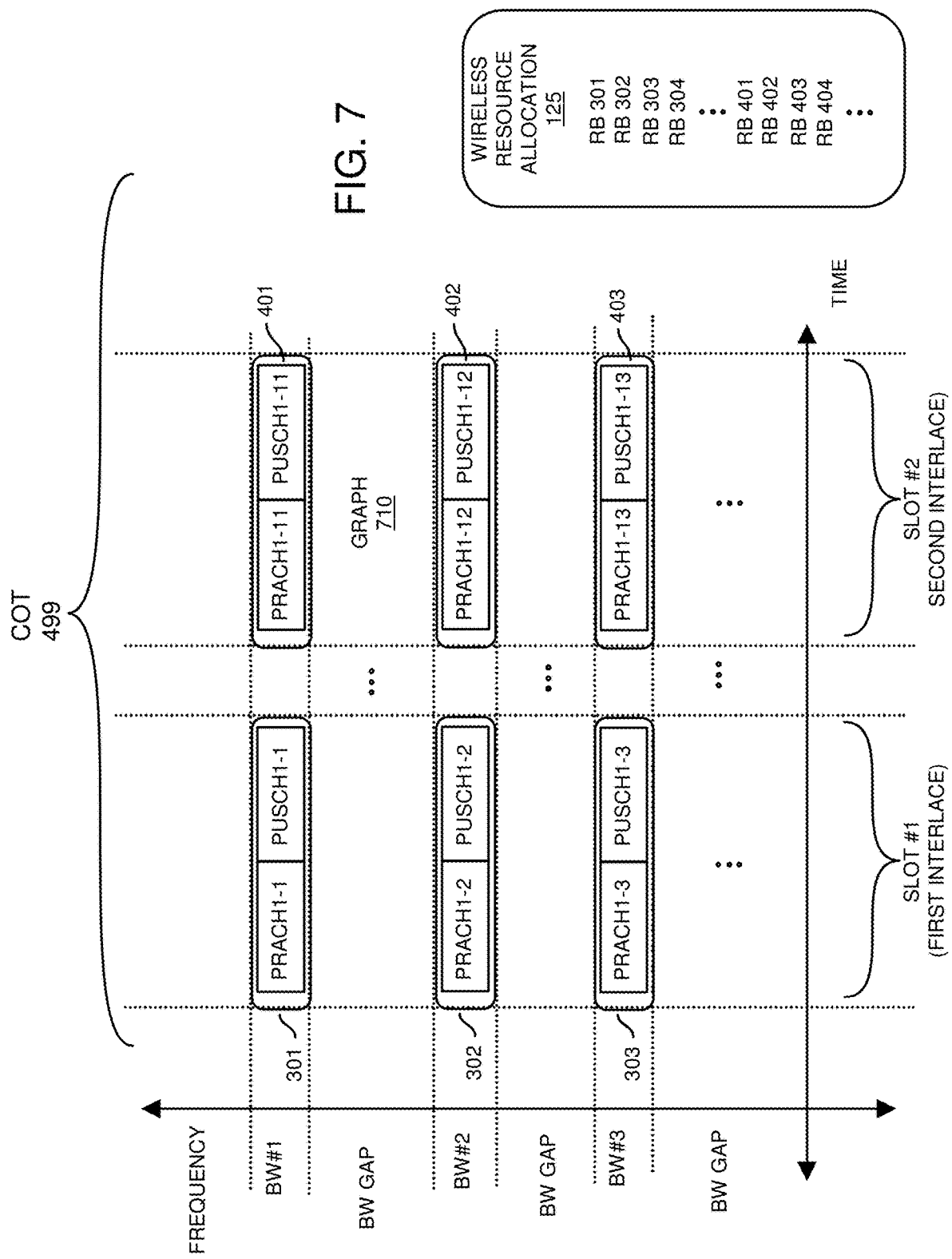
FIG. 7 is an example diagram illustrating transmission of wireless communications over multiple sets of frequency domain resources according to embodiments herein.

FIG. 7 is an example diagram illustrating transmission of wireless communications over multiple sets of frequency domain resources according to embodiments herein.

This example embodiment illustrates use of multiple sets of interlaced wireless channels (or bandwidths) on which to communicate wireless request message information 350 from the mobile communication device 110 to the wireless base station.

For example, assume that the wireless resource allocation information 125 received from the wireless base station 160 or other suitable resource specifies multiple resource blocks such as first set of interlaced blocks 301, 302, 303, 304, etc., and second set of interlaced blocks 401, 402, 403, 404, etc., for use by the mobile communication device 110 to communicate wireless request message information 350 from the mobile communication device 110 to the wireless base station 160.

As discussed herein, the communication manager 140 of the mobile communication device 110 can be configured to partition message information associated with the wireless request message information 350 in any suitable manner for transmission over allocated resource blocks.

In this example embodiment, the communication manager 140 uses a first set of interlaced (non-contiguous or space apart in carrier frequency) resource blocks 301, 302, 303, etc., in slot #1 to communicate preamble portions PRACH1-1, PRACH1-2, PRACH1-3, etc., as well as connection request information portions PUSCH1-1, PUSCH1-2, PUSCH1-3, etc., in a manner as previously discussed.

As further shown, the communication manager 140 of the mobile communication device 110 can be configured to communicate additional information associated with the wireless request message information 350 in one or more additional sets of interlaced resource blocks. For example, as shown in graph 710 of FIG. 7, the communication manager 140 uses the second set of interlaced (non-contiguous or space apart in carrier frequency) resource blocks 401, 402, 403, etc., in slot #2 to communicate preamble portions PRACH1-11, PRACH1-12, PRACH1-13, etc., as well as connection request information portions PUSCH1-11, PUSCH1-12, PUSCH1-13, etc.

Note that partitioning and shared use of resource blocks to carry different data (such as preamble information and connection request information) is shown by way of a non-limiting example embodiment. If desired, the communication manager 140 can be configured to partition transmission communication of data (wireless request message information 350) in any suitable manner.

For example, if desired, the communication manager 140 can be configured to communicate different types of message data (preamble and connection request information) in slot #1 as shown in graph 710. If desired, instead of communicating the preamble information in slot #2, the communication manager 140 can be configured to communicate only connection request information (PUSCH information) in slot #2.

In accordance with further embodiments, note that the mobile communication device 110 (such as an NR-U user equipment) can be configured to duplicate the PRACH portion of wireless request message information 350 (such as MsgA) before each segment of the interlaced PUSCH communications, hence forming a concatenation of repeated PRACH communications with interlaced PUSCH communications.

In yet further embodiments, the mobile communication device 110 can be configured to partition a large preamble (or preamble of any size) into different portions depending on the number of the interlaces (set of non-contiguous resource blocks in a timeslot) of the PUSCH channel. For example, if the available wireless resources as specified by the wireless resource allocation information 125 indicates 10 sets of non-contiguous resource blocks, including a total of 106 resource blocks, then the preamble information is spread across 1272 sub-carrier (106 resource blocks times 12 sub-carrier frequencies). In such an instance, the preamble information is distributed or spread across many sub-channels of the available resource blocks to the wireless base station 160. The receiving wireless base station 160 implements a modified processing to detect the preamble that maximizes the likelihood of the received PRACH across the interlaces (and timing advance, and average of the received power across interlaces, etc.).

Figure 8:
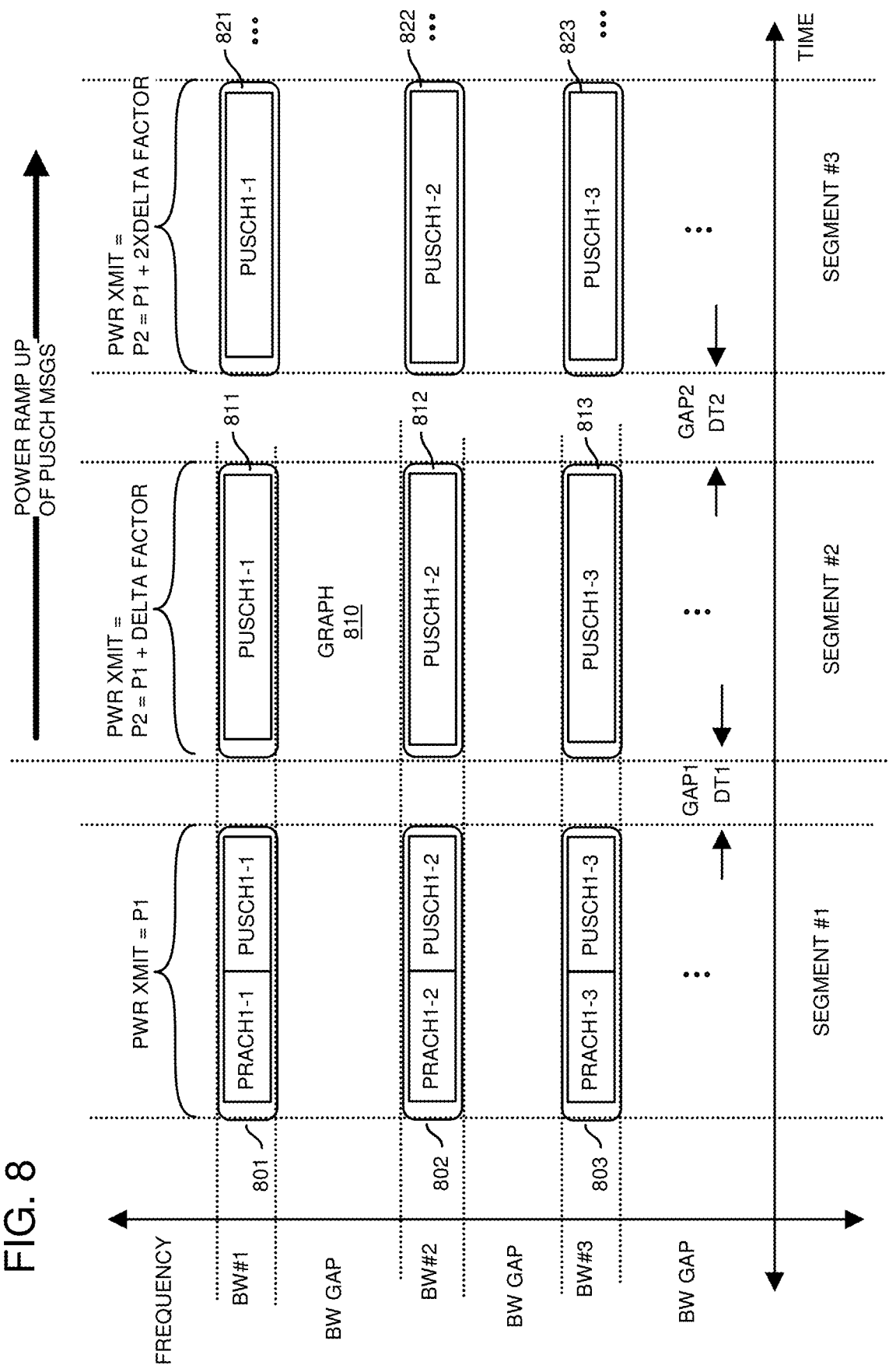
FIG. 8 is an example diagram illustrating ramping power level of secondary wireless communications according to embodiments herein.

FIG. 8 is an example diagram illustrating ramping of secondary wireless communications according to embodiments herein.

As shown in graph 810 of FIG. 8, the mobile communication device 110 can be configured to repeat transmitting different data portions and/or apply separate wireless power adjustments to each of the wireless communications transmitted to the wireless base station 160. Thus, certain embodiments herein include repeatedly transmitting a combination of the preamble communications and/or connection request information to the wireless base station 160.

More specifically, in timeslot #1 of graph 810, at a first wireless power transmit level P1, the mobile communication device 110 communicates first wireless communications (preamble information such as PRACH1) in a first portion of the respective segments 801, 802, 803, etc. Additionally, at power level P1, the mobile communication device 110 communicates second wireless communications (connection request information such as PUSCH1) in a second portion of the respective time segments 801, 802, 803, etc.

In yet further embodiments, the uplink communications in the different segments from the mobile communication device 110 are optimized as follows: The UE may be configured with separate power control adjustments for the PRACH and PUSCH components of wireless request message information 350 (such as msgA) in RMSI or OSI. The power control adjustment for the PUSCH components transmitted in subsequent segments (after an initial transmitted segment) can be represented as an incremental change (delta factor) with respect to the PRACH power level. In one embodiment, a magnitude of the incremental power adjustment depends on the number of sets of non-contiguous resource blocks are used to transmit the PUSCH information. Additionally, or alternatively, a magnitude of the power adjustment (delta factor) also can depend on the size of the PUSCH message being transmitted.

If desired, a variable-length time gap (e.g., such as up to a threshold value of 16 microsecond duration when the mobile communication device does not transmit) may also be configured between PRACH and PUSCH message components (or between one PUSCH message component and another PUSCH component) to allow the mobile communication device 110 time to perform wireless power output adjustments or power ramping. Maintaining each of the gaps DT1, DT2, etc., (for making power adjustments) to be less than a threshold value of 16 microseconds ensures that the mobile communication device 110 does not lose rights in communicating over the acquired shared random access channel.

As further captured by graph 810, in one embodiment, the mobile communication device 110 does not know what power level to transmit the wireless request message information 350. In one embodiment, the mobile communication device 110 measures a downlink reference signal from the wireless base station 160 and estimates a respective wireless pathloss between the wireless base station 160 and the mobile communication device 110. Based on the estimated pathloss, the mobile communication device 110 sets the initial power transmit level to wireless transmit level P1. Thus, in segment #1, the mobile communication device 110 transmits wireless communications a power level P1. For each subsequent transmitted PUSCH message portion, the mobile communication device 110 adjusts (such as increases) the power level of transmitting respective PUSCH message information.

If needed, such as in a case where the wireless base station 110 does not acknowledge receipt of the wireless messages from the mobile communication device during a channel occupancy time of ramping the wireless communications, the communication manager 140 can be configured to repeat transmitting the wireless communications in graph 810, in which the mobile communication device 110 starts transmitting the preamble at a higher initial power level relative to a last cycle, and subsequently ramping the PUSCH messages in a manner as previously discussed. Thus, via an inner control loop, the communication manager 140 ramps a rate of communicating PUSCH message information within a cycle while the communication manager 140 implements an outer loop (such as at the beginning of each new transmit cycle) to ramp power levels of transmitting the preamble information cycle over cycle instead of within each cycle. As previously discussed, eventually, the wireless base station 160 receives the message A and responds via sending a message B.

As previously discussed, embodiments herein are useful over conventional techniques. For example, use of the same set of allocated wireless resources (such as one or multiple sets of non-contiguous resource blocks) eliminates a need to perform multiple listen before talk routines in between sending a preamble and corresponding connection request information over different channels because the same allocated frequency domain resources are used to communicate both the preamble information and connection request information. Use of the same allocated wireless resources to convey a preamble (such as PRACH information) and corresponding connection request information (such as PUSCH information) as described herein also alleviates the need to set up antenna resources of the mobile communication device 110 to different carrier frequencies, which requires a process of adapting transmit power levels to an appropriate transmit power level for the new sets of wireless channel resources. Thus, because the same wireless resources are used to communicate the preamble information and the connection request information, there is no need to adapt the mobile communication device to new wireless power output setting. Accordingly, embodiments herein provide an improved, more expedient way of using shared random access channel resources to establish a wireless communication link.

Figure 9:
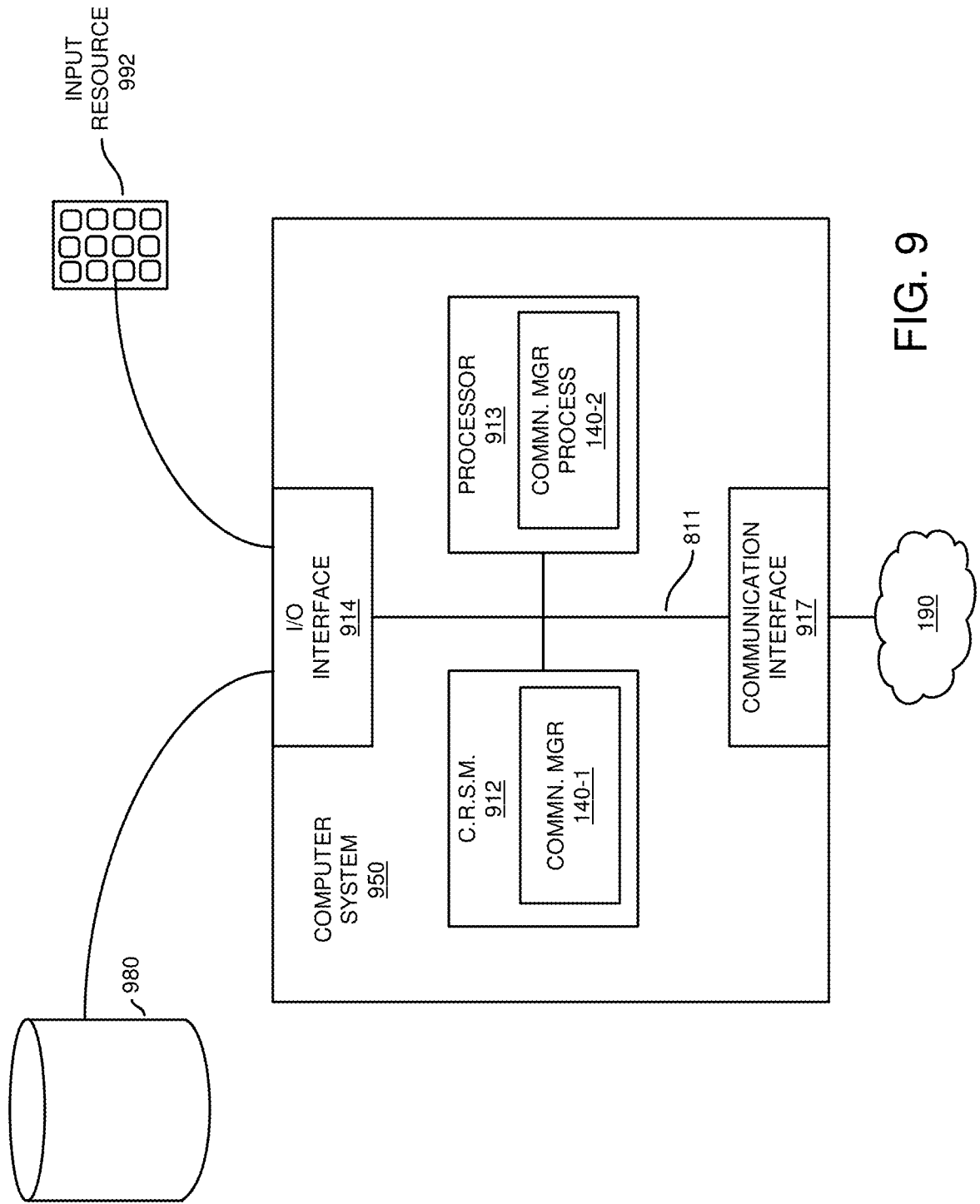
FIG. 9 is an example diagram illustrating example computer hardware and software operable to execute one or more operations according to embodiments herein.

FIG. 9 is an example block diagram of a computer system for implementing any of the operations as previously discussed according to embodiments herein.

Any of the resources (such as communication manager 140, communication manager 141, user equipment 110, wireless base station 160, etc.) as discussed herein can be configured to include computer processor hardware and/or corresponding executable instructions to carry out the different operations as discussed herein.

As shown, computer system 950 of the present example includes interconnect 911 coupling computer readable storage media 912 such as a non-transitory type of media (which can be any suitable type of hardware storage medium in which digital information can be stored and or retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication manager application 140-1 (e.g., including instructions) in a respective wireless station to carry out any of the operations as discussed herein.

During operation of one embodiment, processor 913 accesses computer readable storage media 912 via the use of interconnect 911 in order to launch, run, execute, interpret or otherwise perform the instructions in communication manager application 140-1 stored on computer readable storage medium 912. Execution of the communication manager application 140-1 produces communication manager process 140-2 to carry out any of the operations and/or processes as discussed herein.

Those skilled in the art will understand that the computer system 950 can include other processes and/or software and hardware components, such as an operating system that controls allocation and use of hardware resources to execute communication manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via the flowchart in FIG. 10. Note that the steps in the flowcharts below can be executed in any suitable order.

Figure 10:
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the mobile communication device 110 (user equipment) receives wireless resource allocation information 125 indicating allocation of wireless channel resources.

In processing operation 1020, the mobile communication device 110 communicates a wireless connection request (such as message A) to a wireless base station 160 using the allocation of the wireless channel resources. In one embodiment, the wireless connection request includes: i) a first wireless communication (such as a PRACH message) including a preamble, and ii) a second wireless communication (such as PUSCH message) including connection request information (such as a request, user equipment identifier, etc.) for establishing a wireless communication link the wireless base station 160.

Note again that techniques herein are well suited to facilitate use of a shared wireless channel amongst different types of wireless stations. However, it should be noted that embodiments herein are not limited to use in such applications and that the techniques discussed herein are well suited for other applications as well. Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
at a first mobile communication device in a wireless network environment:
receiving notification of an allocation of wireless channel resources;
wirelessly communicating a connection request message to a wireless base station using the allocated wireless channel resources, the wireless connection request message including:
i) a first wireless communication including a preamble; and
ii) a second wireless communication including connection request information for establishing a respective wireless communication link;
the method further comprising: at the first mobile communication device:
within a channel occupancy time of the first mobile communication device acquiring use of the allocated wireless channel resources via a listen before talk procedure, completing communication of both the first wireless communication and the second wireless communication over the acquired wireless channel resources; and
wherein a combination of the first wireless communication and the second wireless communication represent a message A of a 2-step RACH (Random Access Channel) procedure.

2. The method as in claim 1, wherein the first wireless communication is a PRACH (Physical Random Access Channel) message; and
wherein the second wireless communication is a PUSCH (Physical Uplink Shared Channel) message.

3. The method as in claim 1 further comprising:
subsequent to transmitting the first wireless communication at a first power level, varying a magnitude of repeatedly transmitting the second wireless communication to the wireless base station.

4. The method as in claim 3, wherein varying the magnitude includes:
ramping a power level of repeatedly transmitting the second wireless communication.

5. The method as in claim 1 further comprising:
repeatedly transmitting a combination of the first wireless communication and the second wireless communication to the wireless base station.

6. The method as in claim 1 further comprising:
applying different wireless power adjustments to transmissions of the first wireless communication and transmissions of the second wireless communication.

7. The method as in claim 1 further comprising:
selecting a portion of the allocated wireless channel resources;
partitioning the preamble into multiple portions including a first preamble portion and a second preamble portion based on the selected portion of the allocated wireless channel resources over which the first wireless communication is to be transmitted;
transmitting the first preamble portion over a first carrier frequency of the selected wireless channel resources; and
transmitting the second preamble portion over a second carrier frequency of the selected wireless channel resource.

8. The method as in claim 1 further comprising:
partitioning the preamble into multiple portions including a first preamble portion and a second preamble portion; and
transmitting the first preamble portion and the second preamble portion in a same timeslot using the allocated wireless resources.

9. The method as in claim 1 further comprising:
transmitting the second wireless communication over a PUSCH channel, the second wireless communication being communicated over a first set of wireless carrier frequencies and a second set of wireless carrier frequencies.

10. The method as in claim 1 further comprising:
starting transmission of the second wireless communication within a threshold amount of time after completion of communicating the first wireless communication.

11. The method as in claim 1 further comprising:
partitioning the preamble into multiple portions including a first preamble portion and a second preamble portion; and
transmitting the first preamble portion in a first time slot of the acquired channel occupancy time; and
transmitting the second preamble portion in a second time slot of the acquired channel occupancy time.

12. The method as in claim 1 further comprising:
partitioning the preamble into multiple portions including a first preamble portion and a second preamble portion;
partitioning the connection request information into multiple portions including a first connection request information portion and a second connection request information portion;
transmitting a first pairing of the first preamble portion and the first connection request information portion over a first bandwidth; and
transmitting a second pairing of the second preamble portion and the second connection request information portion over a second bandwidth.

13. The method as in claim 12, wherein the first bandwidth is non-contiguous with respect to the second bandwidth.

14. The method as in claim 12, wherein the first pairing and second pairing are transmitted in a same time slot.

15. The method as in claim 1 further comprising:
transmitting the first wireless communication over a PRACH channel, the first wireless communication including the preamble communicated over a first set of wireless carrier frequencies and a second set of wireless carrier frequencies; and
transmitting the second wireless communication over a PUSCH channel, the second wireless communication including an identity of the first mobile communication device and a request to establish the respective wireless communication link.

16. The method as in claim 1, wherein wirelessly communicating the connection request message includes communicating a duplicate of a first portion of the first wireless communication over the allocated wireless channel.

17. The method as in claim 1 further comprising:
communicating a first instance of the second wireless communication at a first power level from the first mobile communication device to the wireless base station; and
communicating a second instance of the second wireless communication at a second power level from the first mobile communication device to the wireless base station in response to detecting that the wireless base station fails to acknowledge receipt of the communicated first instance of the second wireless communication.

18. A method comprising:
at a first mobile communication device in a wireless network environment:
receiving notification of an allocation of wireless channel resources;
wirelessly communicating a connection request message to a wireless base station using the allocated wireless channel resources, the wireless connection request message including:
i) a first wireless communication including a preamble; and
ii) a second wireless communication including connection request information for establishing a respective wireless communication link; and
wherein the wireless channel resources in the allocation includes identities of sets of wireless carrier frequencies, a first set and a second set of the sets of wireless carrier frequencies being non-contiguous with respect to each other in which to transmit both the first wireless communication and the second wireless communication;
wherein wirelessly communicating the connection request message includes: i) transmitting the first wireless communication over a PRACH (Physical Random Access Channel) channel, the first wireless communication including the preamble communicated over the first set of wireless carrier frequencies and the second set of wireless carrier frequencies; and ii) transmitting the second wireless communication over a PUSCH (Physical Uplink Shared Channel) channel, the second wireless communication including an identity of the first mobile communication device and a request to establish the respective wireless communication link.

19. A system comprising:
a first mobile communication device in a wireless network environment, the first mobile communication device operative to:
receive notification of an allocation of wireless channel resources;
acquire a shared random access channel; and
over the acquired shared random access channel, communicate a wireless connection request to a wireless base station using the allocation of the wireless channel resources, the wireless connection request including:
i) a first wireless communication including a preamble; and
ii) a second wireless communication including connection request information for establishing a wireless communication link; and
wherein the wireless channel resources in the allocation includes identities of sets of wireless carrier frequencies including a first set of wireless carrier frequencies and a second set of wireless carrier frequencies, the sets of wireless carrier frequencies being non-contiguous with respect to each other in which to transmit the first wireless communication and the second wireless communication; and
wherein wirelessly communicating the connection request message includes: i) transmitting the first wireless communication over a PRACH (Physical Random Access Channel) channel, the first wireless communication including the preamble communicated over the first set of wireless carrier frequencies and the second set of wireless carrier frequencies; and ii) transmitting the second wireless communication over a PUSCH (Physical Uplink Shared Channel) channel, the second wireless communication including an identity of the first mobile communication device and a request to establish the respective wireless communication link.

20. The method as in claim 19, wherein a combination of the first wireless communication and the second wireless communication represent a message A of a 2-step RACH (Random Access Channel) procedure.

21. The system as in claim 19, wherein the first mobile communication device is further operative to:
within a channel occupancy time of the first mobile communication device acquiring use of the shared access channel via a listen before talk procedure, complete communication of both the first wireless communication and the second wireless communication using the allocated wireless channel resources.

22. The system as in claim 19, wherein the first mobile communication device is further operative to:
subsequent to transmitting the first wireless communication at a first power level, varying a magnitude of repeatedly transmitting the second wireless communication to the wireless base station.

23. The system as in claim 22, wherein the first mobile communication device is further operative to:
ramp a power level of repeatedly transmitting the second wireless communication.

24. The system as in claim 19, wherein the first mobile communication device is further operative to:
repeatedly transmit a combination of the first wireless communication and the second wireless communication.

25. The system as in claim 19, wherein the first mobile communication device is further operative to:
apply separate wireless power adjustments to repeated transmissions of the first wireless communication and repeated transmissions of the second wireless communication.

26. The system as in claim 19, wherein the first mobile communication device is further operative to:
partition the preamble into multiple portions including a first preamble portion and a second preamble portion;
transmit the first preamble portion over a first carrier frequency of the allocated wireless channel resources; and
transmit the second preamble portion over a second carrier frequency of the allocated wireless channel resources.

27. The system as in claim 26, wherein the first mobile communication device is further operative to:
simultaneously transmit the first preamble portion and the second preamble portion in an assigned timeslot.

28. The apparatus as in claim 19, wherein the first mobile communication device is further operative to:
transmit the first wireless communication over a PRACH channel, the first wireless communication including the preamble communicated over a first set of wireless carrier frequencies and a second set of wireless carrier frequencies; and
transmit the second wireless communication over a PUSCH channel, the second wireless communication including an identity of the first mobile communication device and a request to establish the wireless communication link.

29. Computer-readable storage hardware having instructions stored thereon, the instructions, when carried out by computer processor hardware, cause the computer processor hardware to:
receive notification of an allocation of wireless channel resources;
acquire a shared random access channel; and
via the acquired shared random access channel, communicate a wireless connection request to a wireless base station using the allocation of the wireless channel resources, the wireless connection request including:
i) a first wireless communication including a preamble; and
ii) a second wireless communication including connection request information for establishing a wireless communication link; and
wherein the wireless channel resources in the allocation includes identities of sets of wireless carrier frequencies including a first set of wireless carrier frequencies and a second set of wireless carrier frequencies, the sets of wireless carrier frequencies being non-contiguous with respect to each other in which to transmit the first wireless communication and the second wireless communication;
wherein wirelessly communicating the connection request message includes: i) transmitting the first wireless communication over a PRACH (Physical Random Access Channel) channel, the first wireless communication including the preamble communicated over the first set of wireless carrier frequencies and the second set of wireless carrier frequencies; and ii) transmitting the second wireless communication over a PUSCH (Physical Uplink Shared Channel) channel, the second wireless communication including an identity of the first mobile communication device and a request to establish the respective wireless communication link.

30. A method comprising:
at a first mobile communication device in a wireless network environment:
receiving notification of an allocation of wireless channel resources;
wirelessly communicating a connection request message to a wireless base station using the allocated wireless channel resources, the wireless connection request message including:
i) a first wireless communication including a preamble; and
ii) a second wireless communication including connection request information for establishing a respective wireless communication link;
wherein the wireless channel resources include a first wireless channel; and
wherein wirelessly communicating the connection request message includes: i) communicating a first portion of the first wireless communication over multiple sub-carrier frequencies of the first wireless channel; and ii) communicating a first portion of the second wireless communication over the multiple sub-carrier frequencies.

31. The method as in claim 30, wherein the wireless channel resources include a second wireless channel, the multiple sub-carrier frequencies supporting the first wireless channel and the second wireless channel and being spaced by a bandwidth gap; and
wherein wirelessly communicating the connection request message includes: i) communicating a duplicate of the first portion of the first wireless communication over the multiple sub-carrier frequencies associated the first wireless channel; and ii) communicating a second portion of the second wireless communication over the multiple sub-carrier frequencies associated with the second wireless channel.

32. A method comprising:
at a first mobile communication device in a wireless network environment:
receiving notification of an allocation of wireless channel resources;
wirelessly communicating a connection request message to a wireless base station using the allocated wireless channel resources, the wireless connection request message including: i) a first wireless communication including a preamble; and ii) a second wireless communication including connection request information for establishing a respective wireless communication link;
the method further comprising: at the first mobile communication device; within a channel occupancy time of the first mobile communication device acquiring use of the allocated wireless channel resources via a listen before talk procedure, completing communication of both the first wireless communication and the second wireless communication over the acquired wireless channel resources;

the method further comprising:
partitioning the preamble into multiple portions including a first preamble portion and a second preamble portion;
partitioning the connection request information into multiple portions including a first connection request information portion and a second connection request information portion;
transmitting a first pairing of the first preamble portion and the first connection request information portion over a first bandwidth; and
transmitting a second pairing of the second preamble portion and the second connection request information portion over a second bandwidth;
wherein the first pairing is transmitted in a first time slot of the acquired channel occupancy time and the second pairing is transmitted in a second time slot of the acquired channel occupancy time.

33. A method comprising:
at a first mobile communication device in a wireless network environment:
receiving notification of an allocation of wireless channel resources;
wirelessly communicating a connection request message to a wireless base station using the allocated wireless channel resources, the wireless connection request message including:
i) a first wireless communication including a preamble; and
ii) a second wireless communication including connection request information for establishing a respective wireless communication link;
the method further comprising: at the first mobile communication device: within a channel occupancy time of the first mobile communication device acquiring use of the allocated wireless channel resources via a listen before talk procedure, completing communication of both the first wireless communication and the second wireless communication over the acquired wireless channel resources;
subsequent to transmitting the first wireless communication at a first power level, varying a magnitude of repeatedly transmitting the second wireless communication to the wireless base station;
wherein varying the magnitude of repeatedly transmitting the second wireless communication to the wireless base station includes:
communicating a first instance of the second wireless communication at a first power level to the wireless base station; and
communicating a second instance of the second wireless communication at a second power level to the wireless base station in response to detecting that the wireless base station fails to acknowledge receipt of the communicated first instance of the second wireless communication.

34. A system comprising:
a first mobile communication device in a wireless network environment, the first mobile communication device operative to:
receive notification of an allocation of wireless channel resources;
acquire a shared random access channel; and
over the acquired shared random access channel, communicate a wireless connection request to a wireless base station using the allocation of the wireless channel resources, the wireless connection request including:
i) a first wireless communication including a preamble; and
ii) a second wireless communication including connection request information for establishing a wireless communication link; and
wherein the wireless channel resources in the allocation includes identities of sets of wireless carrier frequencies, the sets of wireless carrier frequencies being non-contiguous with respect to each other in which to transmit the first wireless communication and the second wireless communication;
wherein the first mobile communication device is further operative to: partition the preamble into multiple portions including a first preamble portion and a second preamble portion: transmit the first preamble portion over a first carrier frequency of the allocated wireless channel resources; and transmit the second preamble portion over a second carrier frequency of the allocated wireless channel resources;
wherein the first mobile communication device is further operative to:
transmit the first preamble portion in a first time slot of an acquired channel occupancy time associated with the acquired shared random access channel; and
transmit the second preamble portion in a second time slot of the acquired channel occupancy time.

* * * * *

UNITED STATES PATENT AND TRADEMARK OFFICE
CERTIFICATE OF CORRECTION

| | |
|---|---|
| PATENT NO. | : 11,259,322 B2 |
| APPLICATION NO. | : 16/541865 |
| DATED | : February 22, 2022 |
| INVENTOR(S) | : Ahmad Reza Hedayat, Amitav Mukherjee and Maulik V. Vaidya |

It is certified that error appears in the above-identified patent and that said Letters Patent is hereby corrected as shown below:

In the Claims

Column 22, Line 61, delete ";", insert --:--

Column 24, Line 36, delete ":", insert --;--

Signed and Sealed this
Twenty-sixth Day of April, 2022

Katherine Kelly Vidal
*Director of the United States Patent and Trademark Office*